United States Patent Office 3,025,250
Patented Mar. 13, 1962

3,025,250
RESIN COMPOSITION CONTAINING ALKALI-BARK PRODUCT AND PHENOL-FORMALDEHYDE RESIN, AND METHOD OF PREPARATION
Franklin W. Herrick and Louis H. Bock, Shelton, Wash., assignors to Rayonier Incorporated, Shelton, Wash., a corporation of Delaware
No Drawing. Filed Aug. 23, 1956, Ser. No. 605,725
18 Claims. (Cl. 260—17.2)

This invention relates to resins and resin adhesives and has for its object the provision of resinous condensation products, and especially novel products of the type obtained by reacting a phenolic compound and formaldehyde or a compound which generates formaldehyde, or a compound that provides phenol and formaldehyde, and a product made from the bark of certain coniferous trees. Some of the products of the invention are thermosetting resins, and they may be utilized most advantageously as adhesives, and for other purpose.

Heretofore certain thermosetting phenol-formaldehyde condensation products have been used extensively as adhesives, such as the adhesives used in the manufacture of composite wood veneer products. One type of such condensation product is an alkaline fluid capable of condensing rapidly to form an insoluble resin when it is applied to the surfaces of the materials to be joined together and heated. As an additive to this type of alkaline fluid thermosetting type of adhesive, various kinds of material have been proposed, such as wood flour, walnut shell flour, a slurry of walnut shell flour pretreated in a water solution of sodium hydroxide and finely subdivided barks of trees slurried in a water solution of sodium hydroxide and pretreated by mildly heating the mixture. These adjuvants, such as the slurry of walnut shell flour or the slurry of finely divided tree bark pretreated with sodium hydroxide water solution, operate as interfacial material somewhat like untreated wood flour or walnut shell flour itself operates, insofar as there is considerable solid, granular nonadhesive shell or bark material involved. Such adjuvants, as the alkali-treated slurries of finely subdivided bark, increase the spreading power of the thermosetting phenolformaldehyde resin to which they are added, but they do not materially improve the strength properties of the composite veneer products over that produced by mixtures of untreated walnut shell or finely subdivided bark mixed with the thermosetting phenol-formaldehyde resin. Large additions of alkali-treated bark slurries impair the strength of phenol-formaldehyde thermosetting adhesives to which they are added, but they may increase the spreading power, if for no other reason than that the fluid thermosetting phenol-formaldehyde adhesive component is distributed throughout another somewhat voluminous material. Strength is an important feature of adhesives. Consequently, improvements in adhesives of the type of phenol-formaldehyde condensation products have continued to be desired, especially in the plywood industry where low cost and strong adhesives available in large quantities are sought.

The "alkali-bark derivative" also called "alkali-bark product" is obtained by treating a suitable bark such as various coniferous barks at a temperature of from 90° to 175° C. with an aqueous solution of a suitable alkaline compound in which from 0.03 to 0.20 part of alkaline compound calculated as $Na_2O$ is used to one part of dry bark.

We may use as the alkaline compound for reaction with the bark one of the following compounds NaOH, KOH, $NH_4OH$, $Na_2S$, and $(NH_4)_2S$, mixtures thereof, or compounds or mixtures of compounds which produce these alkali compounds in situ, such as a mixture of lime and soda ash. For the purpose of defining this invention broadly, the foregoing alkaline compounds are characterized as being "$Na_2O$ equivalent," meaning the amount thereof equivalent to the $Na_2O$ as such.

Our alkali-bark product has the capacity of reacting very rapidly with formaldehyde, even at room temperature, to reach an insoluble infusible state. Specifically, one part of the alkali-bark derivative calculated on an ash free basis is capable of condensing with at least 0.05 part of formaldehyde when reacted at pH 9.5 for 4 hours at 25° C. Alkali-bark products suitable for the purposes of the invention are those which have a formaldehyde reactivity of 5% or more as determined by a test hereinafter described and we may, accordingly, further define our alkali-bark derivative as one having "formaldehyde reactivity of 5% or more."

The precise composition of this alkali-bark product is not fully known since it is derived from a mixture of certain polymeric phenolic materials of the bark, but not all of the complex organic hydroxy compounds thereof. It contains various polymeric phenolic materials which may be precipitated from water solution by carbon dioxide. A 30% solution of the alkali-bark product in aqueous sodium hydroxide solution at 50° C., results in a gel in about three minutes upon adding formaldehyde. This reaction with formaldehyde proceeds so rapidly to the formation of an amorphous insoluble product that it cannot be controlled for forming thermosetting plastics. The desired water-soluble alkali-bark derivative is soluble in water solutions of alkalis and may be separated from the undesired organic constituents of the bark by methods of chemical treatment hereinafter to be described more in detail.

The barks of different species of trees vary greatly in their content of alkali-reactive material which is capable of producing the type of thermosetting composition described in this invention. Trees whose bark yields alkali-bark products useful in this invention are: Western hemlock (*Tsuga heterophylla*), Douglas fir (*Pseudotsuga menziessii*), western white fir (*Abies concolor, Abies grandis* and *Abies amabilis*), Sitka spruce (*Picea sitchensis*), coast redwood (*Sequoia sempervirens*), eastern hemlock (*Tsuga canadensis*), and southern yellow pine (*Pinus echinata, Pinus palustris, Pinus taeda, Pinus elliotti* and *Pinus rigida* var. *serotina*).

The alkali-bark products undoubtedly contain phenolic groups and these are probably responsible for the reactivity with formaldehyde. A quantitative test for this reactivity is as follows:

In a 500 ml. beaker, an accurately weighed sample (about 20 g.) of the bark material and approximately 300 ml. of water are well mixed. The pH of the solution is adjusted to 9.5 by adding dropwise 5–10% sodium hydroxide or hydrochloric acid as required. The solution is then washed into a 500 ml. volumetric flask and 25 ml.

of 37% formaldehyde is added. Water is then added to make 500 ml.

A blank determination is made by adding 25 ml. of 37% formaldehyde to a 500 ml. volumetric flask and diluting to volume with water. Five ml. of this solution is added to 50 ml. of water and 10 ml. of 10% sodium sulfide solution. This solution is titrated to pH 9.5 with 0.1 N hydrochloric acid. The reaction is as follows:

$$CH_2O + Na_2SO_3 + H_2O \rightarrow CH_2O \cdot NaHSO_3 + NaOH$$

From this titration is calculated the initial formaldehyde concentration.

After four hours a 5 ml. sample of the original solution is withdrawn, diluted with 50 ml. of water and adjusted to pH 7 with 0.1 N hydrochloric acid. To this solution is added 10 ml. of 10% sodium sulfite solution and it is then titrated with 0.1 N hydrochloric acid to pH 9.5. From this value is calculated the amount of formaldehyde remaining after four hours.

The formaldehyde which has condensed with the bark is determined by subtracting the formaldehyde found in the four hour sample from that found in the blank. This is expressed as grams of formaldehyde per 100 g. of dry, ash free bark material.

The above method of determining formaldehyde was described by Lemme, Chem. Ztg. 27, 896 (1903).

Various alkali bark products were analyzed by the above process with the following results:

TABLE I. FORMALDEHYDE REACTIVITY OF BARK DERIVATIVES

| Species | Conditions of preparation of bark derivative | | | | Formaldehyde reactivity |
|---|---|---|---|---|---|
| | $Na_2O$/NaOH bark a | $Na_2O$/$Na_2S$ bark b | Temp., °C. | Time | |
| Western Hemlock | 0.05 | | 97 | 2 hrs | 7.4 |
| Do | 0.05 | | 125 | 5 min | 9.7 |
| Do | 0.05 | | 150 | 5 min | 8.4 |
| Do | | 0.05 | 150 | 2 hrs | 6.5 |
| Do | 0.0375 | 0.0125 | 97 | 2 hrs | 9.8 |
| Do | | 0.06 | 175 | 5 min | 6.8 |
| Do | | 0.20 | 90 | 2 hrs | 9.6 |
| Douglas Fir | 0.05 | | 97 | 2 hrs | 7.2 |
| Do | 0.05 | | 150 | 2 hrs | 6.4 |
| Do | 0.20 | | 90 | 2 hrs | 6.7 |
| Do | | 0.05 | 97 | 2 hrs | 7.4 |
| White Fir | 0.05 | | 97 | 2 hrs | 6.6 |
| Do | 0.05 | | 150 | 2 hrs | 5.1 |
| Do | 0.20 | | 90 | 2 hrs | 9.7 |
| Do | | 0.05 | 97 | 2 hrs | 6.8 |
| Southern Yellow Pine | 0.05 | | 97 | 2 hrs | 6.0 |
| Do | 0.20 | | 90 | 2 hrs | 9.1 |
| Sitka Spruce | 0.05 | | 97 | 2 hrs | 6.0 |
| Do | 0.20 | | 90 | 2 hrs | 8.9 |
| Do | | 0.05 | 97 | 2 hrs | 8.4 |
| Redwood | 0.05 | | 97 | 2 hrs | 6.0 |
| Do | 0.05 | | 150 | 2 hrs | 6.3 |
| Do | 0.20 | | 90 | 2 hrs | 8.5 |
| Western Red Cedar | 0.05 | | 97 | 2 hrs | 3.9 |
| Alder | 0.05 | | 97 | 2 hrs | 2.4 |
| Black Gum | 0.05 | | 97 | 2 hrs | 3.0 | a Means the $Na_2O$ weight equivalent of NaOH per part of dry bark.
b Means the $Na_2O$ weight equivalent of $Na_2S$ per part of dry bark.

All the alkali-bark products which had a formaldehyde reactivity of 5% or more by this test were found to be effective in the formation of adhesive by our process. All those bark derivatives which had reactivities below 4% were ineffective, i.e. the last three examples in Table I are not satisfactory as raw materials for the practice of this invention.

In one of its aspects the invention utilizes a phenol-formaldehyde condensate syrup which when mixed with alkali hydroxide and an alkali-bark product produces the product herein called a "resin base." This aspect of the invention involves the discovery that these alkali-bark products, especially the alkali-bark derivatives, from a suitable bark are condensible in alkaline medium with fluid stable phenol-formaldehyde condensation products. Involved also is the discovery that the resulting stable condensation resin base can be changed into a thermosetting composition by adding formaldehyde or its equivalent. These thermosetting compositions have a desirable resistance to self-condensation under ordinary atmospheric conditions, whilst having rapid thermosetting properties when heated, thereby rendering them useful for many purposes for which fluid alkaline thermosetting phenol-formaldehyde condensation products are useful. When a mixture of the stable phenol-formaldehyde condensation product and the alkali-bark derivative is heated there is an increase in viscosity but the resulting syrupy product is still a stable phenolic-formaldehyde condensation product which is less reactive toward formaldehyde than the alkali-bark derivative, and which upon adding formaldehyde and heating, produces a homogeneous thermoset product. These results indicate that the resin base is a true condensation product of the stable phenol-formaldehyde syrup or resin and the alkali-bark derivative; but the exact manner of arrangement of the condensed residual radicals of the phenol-formaldehyde condensation product with respect to the residual radicals of the alkali-bark derivative contained in these condensation products is unknown or is only a matter of conjecture.

A stable phenolic-aldehyde condensation product is understood in the art to refer to one in which the ratio of the aldehyde to the phenolic compound is too low to permit gel formation in a solution in aqueous alkali which contains sufficient alkali to prevent precipitation of products produced by further condensation when the solution is heated to temperatures sufficient to evaporate the water but under conditions such that the water is not removed. This is distinguished from a thermosetting resin in such an aqueous alkali solution in that the content of aldehyde is high enough in the thermosetting resin to form a gel when the solution is heated under such conditions. Such is the meaning of the terms, stable condensation product and thermosetting resin used in the present specification and claims.

A reaction product obtained by condensing the water-soluble alkaline fluid stable phenol-formaldehyde condensation product, herein called the phenol-formaldehyde condensate syrup, and the alkali-bark derivative is a relatively mildly alkaline resin base. This resin base is a stable fluid phenol-formaldehyde condensation product, and it can be stored over long periods without deleterious effects. When the fluid resin base is converted to a fluid alkaline thermosetting resin by adding a suitable amount of formaldehyde, it is useful as a fluid adhesive, especially in manufacturing composite wood veneer products, as well as for many other purposes for which fluid thermosetting compounds are useful. The latter alkaline fluid thermosetting compound can be stored without undue deterioration at ordinary atmospheric temperatures for periods which are practicable for plywood and other manufacturing operations, say for a week or more. The use of the specially prepared alkali-bark derivative in the product thus manufactured imparts exceptional properties to the various resulting condensation products which are especially useful when the thermosetting products are used as adhesives.

Phenols useful in condensing with formaldehyde and the alkali-bark derivative include the water soluble mono- and dihydric phenols which are reactive with formaldehyde. In particular phenol, the cresols, catechol, guaiacol, resorcinol and hydroquinone may be used as the phenol in this invention.

The invention will be described more in detail with reference to examples which set forth specific illustrative embodiments of the alkali-bark products, the phenol-formaldehyde syrup, the fluid non-thermosetting resin base, the resins or adhesive compositions, and to processes of manufacturing these compounds, resins and compositions. Unless otherwise specified, parts are expressed throughout the present specification and claims in parts by weight.

*Example 1.*—An alkali-bark derivative was obtained as follows: Western hemlock (*Tsuga heterophylla*) was hogged to sizes not larger than that which will pass a screen of about 2 meshes to the inch and in amount equivalent to 100 parts of bone dry bark, and added to a caustic soda solution containing 6.5 parts NaOH and water to make a total charge of 670 parts. The charge was heated to 97° C. with stirring and was held at this temperature for two hours at which time the reaction was substantially complete, that is nearly all of the soda was combined. The resulting reaction mixture was drained on a screen of about 60 by 40 meshes to the inch and the residue was compressed to remove the alkali-bark derivative thus produced. The resulting solution of this compound was then clarified and spray dried. The dried derivative was water soluble and the gross yield was 37.2 parts of dry powder per 100 parts of bone dry bark.

One pressing of the drained bark removes most of the soluble alkali bark reactive derivative and produces a solution containing a minimum amount of water. More of the soluble alkali-bark derivative can be obtained by reslurrying the pressed cake in water and again expressing the solution. This reslurrying produces somewhat better yields but also produces an ultimate product liquor containing large amounts of water which later must be evaporated. Instead of spray drying the liquor directly produced the liquor containing the soluble alkali-bark derivative may be concentrated by suitable conventional evaporating methods to a desired concentration, say 25–50% solids and used as such or dried, preferably by rapid water-removing methods such as spray drying. Rapid drying from such concentrated solutions avoids the formation of insoluble or inert solids, and such drying methods are preferred.

The alkali-bark derivative thus produced is a soluble reaction product of a part, but not all of the bark substance that is capable of forming an alkali-containing compound. The foregoing example is illustrative of the alkali-bark derivative and the method of making it, but other similar soluble alkali-bark derivatives may be produced by reacting the alkaline compound on a $Na_2O$ equivalent basis as aforementioned with the bark by varying the processes in certain details. If ammonium compounds are employed, however, care must be taken that free ammonia is removed before combination is effected with the stable phenol-aldehyde syrup.

Satisfactory adhesives are obtainable by the processes of the present invention by using any of various alkali-bark derivatives made by treating the bark with the solution of alkaline compound at temperatures ranging from about 90° C. to about 175° C., the ratio of $Na_2O$ equivalent to bark being about 0.03 to about 0.20 part per part of oven dry bark in the reaction mixture. It has been found that superior products with greater adhesive strength are obtained by reacting the alkaline compound with bark at ratios of not over 0.10 part either at temperatures below 125° C. for about two hours or by the use of higher temperatures for shorter times, such as 5 to 30 minutes at 150 to 175° C. Alkali-bark derivatives made in this way are capable of producing adhesives of high strength and high water resistance using a minimum amount of phenol-formaldehyde condensation product. When higher alkaline compound to bark ratios or higher temperatures or longer times are used in the preparation of the bark derivative, it is necessary to use a higher ratio of the phenol-formaldehyde condensation products in order to achieve equally strong and water resistant resins. The foregoing range of temperatures and ratios of alkaline compound to bark are critical in that adhesives capable of producing plywood having high shear strength and wood failure after boiling can be made in accordance with the present invention with alkali-bark derivatives made under more drastic conditions only by incorporating a higher proportion of the more expensive phenol-formaldehyde concentrate. High yields such as those of more than 50% are in general obtainable by using more drastic conditions, e.g. by consuming higher ratios of alkaline compound to bark substance than those above and by using relatively high reaction temperatures for longer periods of time than the range stated. Such alkali-bark derivatives made from a greater proportion of the insoluble portion of the bark material than that obtained by using the above stated optimum conditions have, in general, relatively high average molecular weights, such as 5,000 or higher; and when they are used to make the thermosetting resins in accordance with the present invention they produce less satisfactory adhesives. Optimum yields of the alkali-bark derivative from hemlock bark are about 25% to about 40% of the weight of the oven dry bark from which they are derived, and their average molecular weight is about 3,800. As compared to these preferred alkali-bark derivatives, one made like the one of Example 1, except that the heating was carried out at 150° C. for 2 hours gave a high yield and another made similarly to that of Example 1, except that more NaOH was present, namely 0.25 parts of NaOH per part of dry bark was used and the reaction mixture was heated to 125° C., also gave a high yield. However, the average molecular weights of both alkali-bark derivatives were too high and the thermoset products made with these derivatives, otherwise in accordance with the present invention, were, in general, acceptable in respect to their shear strength and wood failure when used as adhesives for making plywood only by the use of larger amounts of phenol-formaldehyde condensate.

The total water present in the reaction mixture should be sufficient to make the mixture of bark and alkali solution fluid so that the reaction mixture may be agitated and brought uniformly to reaction temperature and uniformly heated during the reaction period. Wide variations can accordingly be made in the amounts of water used and in he consequent concentration of the alkali-hydroxide or sulfide solution. With regard to hemlock bark, the ratio of bone dry bark to alkaline compound to be combined with bark substance is critical within the range of about 0.05 to about 0.10 part of alkaline compound to 1.0 part of bone dry bark. Within this range, the time of reaction may be varied from about 5 minutes to about 4 hours. It has been found that about 80% as much of the alkali-bark derivative is obtained by heating the mixture for 15 minutes to optimum temperatures as that which is obtained by heating the mixture for four hours, provided the above alkali to bark ratio is used. Well within a four hour period, say two hours or sometimes less, equilibrium is substantially established in the reaction between the alkaline compound present and the kind of bark substances sought to be combined with the alkali. Longer heating periods than four hours do not materially increase the yield and they offer no advantage. Open or closed reaction vessels may be used but at temperatures above the boiling points of the reaction mixtures, closed pressure vessels are necessary.

The preferred alkali-bark derivatives are those which are produced with relatively low alkaline compound to bark ratios and either with prolonged digestion at relatively low temperatures or short treatment at high temperatures. In cases where all of the alkaline compound is not exhausted and relatively large amounts are present, satisfactory products and residues can still be obtained by the use of lower temperatures within the large range or shorter treating periods, or both; even some excess of the compound may be present in the reaction mixture over that required to combine with the desired constituents of the bark, provided the temperature is low and time of treatment is also regulated so that the alkaline compound consumed is about 0.05 to about 0.10 part of alkaline compound calculated on a basis of $Na_2O$ equivalent per part of bone dry bark. When this proportion of hemlock bark substance is consumed and the indicated proportion of residue is produced, the preferred alkali-bark derivatives suitable for the purposes of the present invention are produced.

The preferred alkali-bark derivatives produce adhesives having higher ranges of resistance to hydration in boiling water tests than are produced by using the other described alkali-bark derivatives, and they are most suitable for making the so-called exterior types of plywood. The other alkali-bark derivatives obtainable by the use of the higher ratios of alkali to bark or at the higher temperatures for longer times are satisfactory, however, for making adhesives having less resistance to boiling water tests such as used in manufacturing interior type plywoods when low ratios of phenol-formaldehyde condensate are used or are satisfactory for making boil proof adhesives when a higher ratio of phenol-formaldehyde condensate is used. Such alkali-bark derivatives contain relatively more of the original insoluble high molecular weight bark substance.

All of these alkali-bark derivatives are water soluble. They may be dried by rapid water-removing methods, such as spray drying, and they are rapidly reactive in the presence of alkaline water solutions with aldehydes such as formaldehyde or its equivalent. Even at normal atmospheric temperatures a solution of any of the described alkali-bark derivatives soon forms a gel when formaldehyde is added. Upon heating, the condensation is extremely rapid.

The novel resin base is prepared, in general, by reacting any of the above described alkali-bark derivatives with a previously prepared alkaline fluid stable phenolic-aldehyde condensation product herein designated the phenolformaldehyde condensate syrup.

The Phenol-Formaldehyde Condensate Syrup

The water-soluble fluid alkaline stable phenolformaldehyde product may be prepared as illustrated by the following example.

*Example 2.*—A mixture of 188 parts (2 mols) of phenol, 130 parts (1.6 mols) of 37% formaldehyde solution (100 parts of phenol per 25.5 formaldehyde) and 1 part of sodium hydroxide was heated to 95°–100° C. with stirring for one hour. The resulting condensation product was an alkaline fluid or syrup and contained no free formaldehyde as determined by the hydroxylamine hydrochloride method. The syrup contained 74% resin ingredients and had a viscosity of 20 centipoises at 25° C.

Modified phenol-aldehyde syrups having high viscosities up to about 1000 centipoises at 74% concentration are useful for the purposes of this invention. These higher viscosities may be produced by further condensation which may be obtained by longer heating of the reaction mixture in the presence of additional amount of the caustic alkali. Sufficient alkali must be present to maintain the condensation product in solution and sodium hydroxide or potassium hydroxide can be used for this purpose. About 0.7 to about 1.2 mols of formaldehyde or formaldehyde yielding compounds such as paraformaldehyde or hexamethylene tetramine per mol of phenol may be used instead of formaldehyde. This corresponds to about 22.5 to about 38 parts formaldehyde per 100 parts phenol. Condensation temperatures of about 90° C. to about 100° C. are desirable but any higher or lower temperature at which condensation takes place can be used.

The Resin Base

The resin bases are prepared by heating a reaction mixture containing a water solution of the alkali-bark derivative, an alkali-hydroxide and any of the described phenol-formaldehyde condensate syrups until the viscosity of the mixture has increased and condensation has taken place, as illustrated by the following examples. The viscosity of the alkaline fluid resin bases depends primarily on the degree of condensation and is influenced by the presence of more or less water. Sufficient alkali-hydroxide must be present to maintain the condensation product in solution. Useful resin bases range in viscosity from about 200 to about 10,000 centipoises at a concentration of 30 to 40% at 25° C. In forming these condensation products, any temperature at which condensation takes place can be used but it is desirable to employ temperatures of about 90° C. to about 100° C. for this purpose. The resin bases made in accordance with the present invention are condensation products resulting from the condensation in alkaline medium of about 15 to about 100 parts of condensed solids contained in the phenol-formaldehyde syrup per 100 parts of alkali-bark derivative solids. When these proportions of solids are condensed by heating to form the resin bases and the resin bases are converted to thermosetting fluid resins by adding suitable proportions of formaldehyde, the plywood made by using the resulting product as adhesive has properties which meet accepted standards for interior and exterior plywood. The preferred resin bases are made by using phenol-formaldehyde syrup containing about 30 to about 100 parts of condensed phenol-formaldehyde solids per 100 parts of alkali-bark derivative solids. The latter resin bases when converted to thermosetting fluid resins are used as adhesives to make plywood and result in the better grades of exterior types of plywood. Such resins are preferred in that they are used to make an adhesive which has superior strength and resistance to moisture.

*Example 3.*—A water solution composed of 80 parts of the solid alkali-bark derivative, made in accordance with Example 1, 6.3 parts sodium hydroxide and 162 parts of water, was heated with stirring to refluxing temperature which was about 100° C. Then 52.5 parts of phenol-formaldehyde condensate syrup made of phenol and formaldehyde, as described specifically in Example 2, was added and stirring was continued at refluxing temperature for 30 minutes (about 100° C.). The resulting fluid homogeneous reaction product had a viscosity of 300 centipoises at 25° C. and 40% total solids. The pH of the product was 9.6. At ordinary atmospheric temperatures the product had exceptionally good shelf life. After storing two months at room temperature, the viscosity of this resin base had increased to 1,080 centipoises.

*Example 4.*—A solution composed of 100 parts of the alkali-bark derivative prepared in accordance with Example 1, 10 parts of sodium hydroxide and 260 parts of water was heated with stirring to refluxing temperature. Then 28.8 parts of the phenol-formaldehyde condensation syrup described in Example 2 were added and stirring was continued at refluxing temperature for three hours. The resulting solution had a viscosity of 1,600 centipoises at 25° C. The solution contained 32.5% solids.

The Adhesive

*Example 5.*—Two hundred parts of the resin base solution made in accordance with Example 3, 14 parts of paraformaldehyde (17.5 parts formaldehyde per 100 parts resin base solids) and 15 parts of walnut shell flour were mixed and the mixture was applied to 0.1 inch Douglas fir veneer at a spread of 60 lbs. per 1,000 sq. ft. of double glue line. The veneers were assembled into three-ply panels and pressed at 150 lbs. per sq. in. at a temperature of 140° C. for 10 minutes. The plywood obtained had excellent properties. Six panels thus made had an average dry shear strength of 359 lbs. per sq. in. with a wood failure of 99%. After a standard Douglas Fir Plywood Association boiling test, the average wet shear was 222 lbs. per sq. in. with a wood failure of 87%.

*Example 6.*—Two hundred parts of the solution made in accordance with Example 4, 20 parts of walnut shell flour and 8.4 parts of paraformaldehyde (13 parts formaldehyde per 100 parts resin base solids) were mixed and the mixture was applied to Douglas fir veneer at a spread of 60 lbs. per 1,000 sq. ft. of double glue line and pressed as described in the next preceding example. The resulting plywood had a dry shear of 301 lbs. per sq. in. with 89% wood failure. After a standard Douglas Fir Plywood Association boiling test, the average wet shear was 155 lbs. per sq. in. with 60% wood failure.

*Example 7.*—A mixture of 110 parts of catechol (1 mole), 65 parts (0.8 mole) of 37% formaldehyde solution and 0.5 parts of sodium hydroxide dissolved in 5 parts of water was heated at 95–100° C. with stirring for 45 minutes. Analysis for free formaldehyde showed 0.057 mole at the end of 15 minutes and 0.003 mole at the end of 45 minutes. The resulting product was a clear amber syrup.

A mixture of 87 parts of solid alkali-bark derivative containing 7 parts of water made in accordance with Example 1, 6 parts of sodium hydroxide and 234 parts of water was heated to reflux temperature and stirred until dissolved. Then 53.6 parts of the above catechol-formaldehyde condensate solution was added and the mixture was heated 30 minutes at 99° C. with stirring. The resulting solution had a viscosity of 1,520 centipoises at 25° C. The solution contained 32.5% solids.

Resin bases were made in a similar manner from guaiacol and hydroquinone using 124 parts of guaiacol and 110 parts of hydroquinone. The resin bases after condensing the above syrups with alkali-bark derivative had viscosities of 600 and 850 poises respectively.

*Example 8.*—A mixture of 216 parts of m-cresol (Eastman Kodak Co. Practical) (2 moles), 130 parts of 37% formaldehyde (1.6 moles) and 1 part of triethanol amine was treated with 21 parts of sodium hydroxide dissolved in 40 parts of water at room temperature. The resulting exothermic reaction caused the temperature to rise to reflux in 10 minutes. Thirteen parts of sodium hydroxide and 150 parts of water were then added and the mixture was cooled to room temperature. Analysis for free formaldehyde showed none to be present. The resulting product was a clear amber syrup.

A mixture of 109 parts of solid alkali-bark derivative containing 9 parts of water made in accordance with Example 1, 240 parts of water and 104 parts of the above cresol-formaldehyde condensation solution was heated at 99° C. for 45 minutes with stirring. The resulting solution had a viscosity of 1,800 centipoises at 25° C. and had a pH of 10.2. The solution contained 34% solids.

*Example 9.*—A mixture of 110 parts of resorcinol (1 mole), 50 parts of water and 20 parts of 37% formaldehyde was heated at 80° C. for 5 minutes. The source of heat was removed and 35 parts of 37% formaldehyde as added slowly with stirring. The 0.5 part of oxalic acid dissolved in 5 parts of water was added. The reaction was exothermic raising the temperature to reflux. After refluxing 5 minutes, the product was cooled and diluted with 60 parts of water and 4 parts of 50% sodium hydroxide. The resulting solution had a pH of 7.4 and was a clear dark amber syrup.

A mixture of 87 parts of solid alkali-bark derivative containing 7 parts of water made in accordance with example 1, 6 parts of sodium hydroxide, 199 parts of water and 86 parts of the above resorcinol-formaldehyde condensation solution was heated at 99° C. for 2.5 hours with stirring. The resulting solution had a viscosity of 220 centipoises at 25° C. The pH was 9.3 and the solution contained 32.5% solids.

*Example 10.*—A mixture of 200 parts of phenol-formaldehyde condensation solution as described in Example 2 and 36 parts of resorcinol was heated to refluxing and stirred for 30 minutes. The mole ratio of resorcinol to phenol was 0.35.

A mixture of 109 parts of solid alkali-bark derivative containing 9 parts of water made in accordance with Example 1, 316 parts of water, 7.5 parts of sodium hydroxide and 56 parts of phenol-resorcinol-formaldehyde condensate solution described above was heated at 99° C. with stirring for 5 hours. The resulting solution had a viscosity of 500 centipoises at 25° C., the pH was 9.8 and it contained 32% solids.

*Example 11.*—An alkali-bark derivative was made by digesting 100 parts of bone dry hemlock bark with 25.8 parts of sodium hydroxide and water to make a total of 670 parts. The charge was heated at 150° C. with stirring in an autoclave for 2 hours. The derivative was obtained by following the procedure described in Example 1. The gross yield was 90 parts of powder.

A resin base was made by reacting 116 parts of the alkali-bark derivative containing 16 parts of water with 7.5 parts of sodium hydroxide, 260 parts of water and 139 parts of phenol-formaldehyde condensate solution described in Example 2 by heating with stirring at 99° C. for 2 hours. The resulting solution had a viscosity of 820 centipoises at 25° C., a pH of 10.6 and contained 40% solids. The above resin base contained 100 parts of phenol-formaldehyde condensate per 100 parts of alkali-bark derivative.

*Example 12.*—A solution containing 150 parts of alkali-bark derivative as described in Example 1 in 600 parts of water was heated to 80° C. and acidified with 150 parts of 36% hydrochloric acid. The precipitate was filtered and washed with 5% hydrochloric acid to remove inorganic salts. A yield of 95 parts of dry ash free material was obtained.

A resin base was prepared by reacting 100 parts of the ash free bark derivative described above with 15 parts of sodium hydroxide, 335 parts of water and 70 parts of phenol-formaldehyde condensate solution described in Example 2 by heating to refluxing and stirring for 90 minutes. The resulting solution had a viscosity of 1,500 centipoises at 25° C., a pH of 9.5 and it contained 30.5% solids.

*Example 13.*—An alkali-bark derivative was made by heating 100 parts of bone dry western hemlock bark with 6.5 parts of sodium hydroxide and water to make a total of 833 parts. The charge was heated to 150° C. in an autoclave over a period of 20 minutes, held at that temperature for 5 minutes and then cooled rapidly. The derivative was obtained by following the procedure described in Example 1. The gross yield was 36.3 parts of powder.

A resin base was made by reacting 107 parts of the above alkali-bark derivative containing 7 parts of water with 7.5 parts of sodium hydroxide, 264 parts of water and 136 parts of phenol-formaldehyde condensate solution described in Example 2 by heating with stirring at 99° C. for 90 minutes. The resulting solution had a viscosity of 740 centipoises at 25° C., a pH of 10.0 and contained 40% solids.

*Example 14.*—An alkali-bark derivative was made by heating 100 parts of bone dry western hemlock bark with 6.3 parts of sodium sulfide and water to make a total of 833 parts. The mixture was heated at 150° C. with stirring in an autoclave for 2 hours. The alkali-bark derivative was obtained by following the procedure described in Example 1. The gross yield was 46.6 parts of powder.

A resin base was made by reacting 110 parts of the above alkali-bark derivative containing 10 parts of water with 7.5 parts of sodium hydroxide, 260.5 parts of water and 70 parts of phenol-formaldehyde condensation solution described in Example 2 by heating with stirring at 99° C. for one hour. The resulting solution had a viscosity of 750 centipoises at 25° C., a pH of 10.2 and contained 40% solids.

Adhesive tests were run on the above resin bases as described in Example 5. In each case 200 parts of resin base solution were used.

| Resin | Base | Para-formaldehyde | Walnut shell flour | Dry shear test | | Boil test | |
|---|---|---|---|---|---|---|---|
| | | | | P.s.i. | Wood failure, percent | P.s.i. | Wood failure, percent |
| Ex. 7 | Catechol | 10 | 16 | 270 | 85 | 131 | 60 |
| | Guaiacol | 10 | 16 | 280 | 86 | 172 | 53 |
| | Hydroquinone | 10 | 16 | 260 | 94 | 171 | 88 |
| Ex. 8 | Cresol | 10 | 16 | 258 | 96 | 184 | 93 |
| Ex. 9 | Resorcinol | [1] 8 | 16 | 310 | 96 | 189 | 90 |
| Ex. 10 | Phenol-resorcinol | [1] 8 | 16 | 295 | 94 | 197 | 92 |
| Ex. 11 | Phenol | 10 | 16 | 287 | 96 | 197 | 90 |
| Ex. 12 | Phenol | 10 | 16 | 265 | 88 | 156 | 93 |
| Ex. 13 | Phenol | 12 | 16 | 298 | 92 | 198 | 88 |
| Ex. 14 | Phenol | 10 | 16 | 238 | 93 | 181 | 87 |

[1] Hexamine.

Barks of other coniferous trees were treated in the manner described in Example 1. The yields varied with the species and are given in the following table. The alkali-bark derivatives were converted to adhesive bases by the process described in Example 4.

| Tree | Alkali-bark derivative, gross yield | Dry shear test | | Boil test | |
|---|---|---|---|---|---|
| | | P.s.i. | Wood failure | P.s.i. | Wood failure |
| Douglas Fir: *Pseudotsuga taxifolia* | 32.2 | 300 | 85 | 167 | 68 |
| Western White Fir: *Abies concolor, Abies grandis, Abies amabilis* | 34.7 | 300 | 93 | 158 | 68 |
| Sitka Spruce: *Picea sitchensis* | 50.0 | 335 | 89 | 189 | 67 |
| Coast Redwood: *Sequoia sempervirens* | | 297 | 90 | 185 | 72 |

High relative viscosity may be produced by employing higher concentrations of reactants or longer reaction periods. Either the high viscosity resin bases, say 10,000 centipoises, or the low viscosity resin bases, say 200 centipoises, may be satisfactorily employed in making the adhesives of the present invention, depending upon the viscosity of adhesive desired. Alkali hydroxides in excess of that required to give a resin base of about pH 8 to 11 offers no advantage, but higher pH resin bases can be used. Any lower pH resin base can be used as long as the resin base is in solution. About 10 parts to about 20 parts of formaldehyde per 100 parts of resin base solids produce completely cured resins. Greater proportions of formaldehyde may be used but such amounts are unnecessary and merely constitute a non-functioning excess of this reactant. A high viscosity resin base usually enables the production of a high viscosity thermosetting product by relatively direct means, and in turn, relatively lower viscosity resin bases usually enable the preparation of low viscosity thermosetting products by direct means. High viscosity fluid adhesives are not as readily absorbed by wood veneers as are the low viscosity adhesives and they may be used with or withou admixing interface material, whereas the more readily absorbed low viscosity products such as those having a viscosity of 200 centipoises, require the use of interface material in order to retain sufficient adhesive in the interface zone. In the latter case the strength of the interface material is important, as well as the strength of the adhesive, where the strength of the bond is important.

This application is a continuation-in-part of our co-pending application Serial No. 365,256, filed June 30, 1953, now abandoned.

We claim:

1. A resin base obtained by heating a reaction mixture containing water, a water-soluble alkali-bark product obtained from a coniferous bark having a formaldehyde reactivity of at least 5%, a liquid stable alkaline phenol-formaldehyde syrup and an alkali hydroxide of the group consisting of sodium hydroxide and potassium hydroxide, said heating being continued until a condensation product of the solids of said phenol-formaldehyde syrup and the solids of said alkali-bark product is formed and the resulting liquid reaction product has a viscosity of about 200 to about 10,000 centipoises at a concentration of 30 to 40% at 25° C.; said stable resin base containing about 15 to about 100 parts of condensed phenol-formaldehyde solids per 100 parts of solids of said alkali-bark product, said alkali hydroxide being at least sufficient to maintain the condensation products in said resin base in solution; and said liquid stable alkaline phenol-formaldehyde syrup being obtained by heating a reaction mixture containing phenol, an alkali hydroxide solution in water and about 22.5 to about 38 parts formaledhyde per 100 parts phenol until a liquid stable alkaline condensation product is formed, the alkali hydroxide being present in the solution in amount sufficient to maintain said phenol-formaldehyde condensation product in solution and being one of the group consisting of sodium hydroxide and potassium hydroxide.

2. The resin base in accordance with claim 1 which is obtained by condensing about 30 to about 100 parts of condensed phenol-formaldehyde solids per 100 parts solids of said alkali-bark product.

3. The resin base in accordance with claim 1 in which the alkali-bark product is from a bark of the group consisting of hemlock, spruce, Douglas fir, white fir, redwood, and southern yellow pine.

4. The resin base in accordance with claim 1 in which the alkali-bark product is an aromatic hydroxy compound obtained by heating the bark in a water solution of an alkaline compound in the proportion of about 0.03 to about 0.10 part alkaline compound to one part of dry bark until the alkali is substantially all combined with a portion of the bark.

5. The resin base in accordance with claim 1 in which the alkali-bark product is further characterized in that one part of the alkali-bark product (calculated on an ash free basis) is capable of condensing with at least 0.05 part of formaldehyde when reacted at pH 9.5 for four hours at 25° C.

6. A resin base obtained by heating a reaction mixture containing water, a water-soluble alkali-bark product obtained from coniferous bark having a formaldehyde reactivity of at least 5%, a liquid stable alkaline phenol-formaldehyde syrup and an alkali hydroxide of the group consisting of sodium hydroxide and potassium hydroxide, said heating being continued until a condensation product of said phenol-formaldehyde syrup and said alkali-bark product is formed and the resulting liquid reaction product has a viscosity of about 200 to about 10,000 centipoises at a concentration of 30 to 40% at 25° C.; said resin base containing about 15 to about 100 parts of condensed phenol-formaldehyde per 100 parts of said alkali-bark product, said alkali hydroxide being at least sufficient to maintain the condensation products in said resin base in solution; said alkali-bark product being an aromatic hydroxy compound obtained by heating the coniferous bark in a water solution of an alkaline compound in the proportion of about 0.03 to about 0.20 part of Na₂O equivalent per part of dry bark until the alkali is substantially all combined with a portion of the bark; and said liquid stable alkaline phenol-formaldehyde syrup being obtained by heating a reaction mixture containing phenol, an alkali-hydroxide solution in water and about 22.5 to about 38 parts formaldehyde per 100 parts phenol until a liquid stable alkaline condensation product is formed, the alkali-hydroxide water solution being present in amount sufficient to maintain said phenol-formaldehyde condensation product in solution and being one of the group consisting of sodium hydroxide and potassium hydroxide.

7. The product in accordance with claim 6 in which the resin base is obtained by condensing about 30 to about 100 parts of condensed phenol-formaldehyde solids per 100 parts solids of said alkali-bark product.

8. The product in accordance with claim 6 in which the alkali-bark product is obtained by heating the reaction mixture of bark and water solution of alkali for about two hours at a temperature not higher than about 100° C. until the free alkali in the solution is substantially consumed.

9. A liquid stable resin base comprising a liquid stable alkaline phenol-formaldehyde condensation product combined with water-soluble hydroxy aromatic compounds obtained from coniferous bark, water and sufficient alkali hydroxide to hold the product in solution; said hydroxy aromatic compounds being material extracted from coniferous bark by heating said bark in an aqueous solution of an alkaline compound, said aromatic compound having a formaldehyde reactivity of at least 5%; said phenol-formaldehyde condensate being obtained by condensing about 22.5 to about 38 parts of formaldehyde per 100 parts of phenol in aqueous alkaline medium until a stable condensation product is formed; and said resin base being obtained by condensing in aqueous alkaline medium about 15 to about 100 parts of said phenol-formaldehyde condensate per 100 parts of said alkali-bark derivative until a stable condensation product is formed, said alkali in admixture with said stable phenol-formaldehyde condensation product being an alkaline compound of the group consisting of sodium hydroxide sodium sulfide, potassium hydroxide and potassium sulfide.

10. The liquid stable resin base according to claim 9 in which the alkali-bark product is from a bark of the group consisting of hemlock, spruce, Douglas fir, white fir, redwood, and southern yellow pine.

11. The resin base in accordance with claim 9 in which about 30 to about 100 parts of the solids of the phenol-formaldehyde syrup per 100 parts of said alkali-bark product are condensed.

12. The resin base in accordance with claim 9 in which the alkali-bark product is obtained by heating a reaction mixture comprising hemlock bark and a water solution of an alkali hydroxide in the proportion of about 0.03 to about 0.20 parts of alkali-hydroxide per part of dry bark for less than four hours at a temperature not higher than about 100° C. until the free alkali-hydroxide in the solution is substantially consumed.

13. The process of making a liquid alkaline resin base which contains a liquid stable alkaline phenol-formaldehyde condensation product joined by condensation to a water-soluble aromatic hydroxy compound obtained from a coniferous bark of the group consisting of hemlock, spruce, Douglas fir, white fir, redwood, and southern yellow pine, which comprises heating a mixture comprising a liquid aqueous stable alkaline phenol-formaldehyde condensation product containing about 15 to about 100 parts of phenol-formaldehyde condensable solids per 100 parts bark product, water and alkali to a condensation temperature until a liquid stable alkaline condensation product is formed having a viscosity of about 200 to about 10,000 centipoises at 25° C., said alkali being sufficient to maintain said condensation product in solution, said liquid phenol-formaldehyde condensate being obtained by heating to a condensation temperature a mixture containing about 22.5 to about 38 parts formaldehyde per 100 parts phenol in an aqueous alkaline medium until a liquid stable alkaline condensation product is formed and which contains sufficient alkali-hydroxide to maintain said condensation product in solution, said water-soluble aromatic hydroxy compounds obtainable from the bark being an alkali-bark product obtained by heating at a temperature of about 90° C. to about 125° C. a reaction mixture comprising bark and a water solution of an alkaline hydroxide in the proportion of about 0.03 to about 0.20 parts Na₂O equivalent per part of bark until the alkali is substantially all combined with a portion of the bark, and said alkali hydroxide being one of a group consisting of the hydroxides of sodium and potassium.

14. The process in accordance with claim 13 in which the alkali-bark product is made by heating the reaction mixture of alkali hydroxide and at a temperature of about 90° C. to about 100° C. for about two hours.

15. A fluid thermosetting composition comprising a liquid stable alkaline resin base, said liquid stable alkaline resin base comprising a liquid stable alkaline phenol-formaldehyde condensation product combined with water-soluble hydroxy aromatic compounds obtained from a coniferous bark of the group consisting of hemlock, spruce, Douglas fir, white fir, redwood, and southern yellow pine, water and sufficient alkali-hydroxide to hold the product in solution; said water soluble hydroxy aromatic compounds being alkali-bark products which comprise alkali-containing solubilized compounds of the insoluble portions of the bark and having a formaldehyde reactivity of at least 5%; said phenol-formaldehyde condensate being obtained by condensing about 22.5 to about 38 parts of formaldehyde per 100 parts of phenol in aqueous alkaline medium; and said resin base being obtained by condensing in aqueous alkaline medium about 15 to about 100 parts of said phenol-formaldehyde condensate per 100 parts of said alkali-bark product until a stable condensation product is formed, said alkali being one of a group consisting of sodium and potassium.

16. The process of making a liquid thermosetting adhesive which comprises adding formaldehyde to a liquid stable alkaline resin base in the proportion of at least 10 parts formaldehyde per 100 parts of a resin base solids; said liquid stable alkaline resin base comprising a liquid stable alkaline phenol-formaldehyde condensation product combined with water-soluble hydroxy aromatic compounds obtained from coniferous bark having a formaldehyde reactivity of at least 5%, water and sufficient alkali-hydroxide to hold the product in solution; said stable alkaline phenol-formaldehyde condensation product being combined with the water-soluble hydroxy aromatic compounds by a condensation wherein a water solution containing a mixture of said stable phenol-formaldehyde condensation product containing sufficient alkali to hold the condensation product in solution and said water-soluble aromatic compounds is heated in the presence of an alkali until condensation takes place; said hydroxy aromatic compounds being alkali-bark derivatives which comprise alkali-containing solubilized compounds of the insoluble portions of the bark; said phenol-formaldehyde condensate being obtained by condensing about 22.5 to about 38 parts of formaldehyde per 100 parts of phenol in aqueous alkaline medium; and said resin base being obtained by condensing in aqueous alkaline medium about 15 to about 100 parts of said phenol-formaldehyde condensate per 100 parts of said alkali-bark product until a stable condensation product is formed, said alkali hydroxide being one of a group consisting of the hydroxide of sodium and potassium.

17. The resin base in accordance with claim 9 in which the alkali-bark product is obtained by heating a reaction mixture comprising hemlock bark and a water solution of a sodium sulfide in the proportion of about 0.03 to 0.10 part of sodium sulfide per part of dry bark until the sodium sulfide is substantially consumed.

18. The process in accordance with claim 13 in which the alkali-bark product is made by heating the reaction mixture with sodium sulfide as the alkaline compound until the sodium sulfide is substantially all consumed.

References Cited in the file of this patent

UNITED STATES PATENTS

| | | |
|---|---|---|
| Re. 23,347 | Redfern | Mar. 20, 1951 |
| 1,799,816 | Hole | Apr. 7, 1931 |
| 1,802,390 | Novotny | Apr. 28, 1931 |
| 2,053,850 | Sturken | Sept. 8, 1936 |
| 2,319,182 | Van der Pyl | May 11, 1943 |
| 2,362,274 | Hurst | Nov. 7, 1944 |
| 2,385,374 | Rhodes | Sept. 25, 1945 |
| 2,437,710 | Rhodes | Mar. 16, 1948 |
| 2,574,784 | Heritage | Nov. 13, 1951 |
| 2,574,785 | Heritage | Nov. 13, 1951 |
| 2,610,138 | Heritage | Sept. 9, 1952 |
| 2,675,336 | Stephan | Apr. 13, 1954 |
| 2,697,081 | Heritage | Dec. 14, 1954 |
| 2,781,327 | Ayers et al. | Feb. 12, 1957 |

FOREIGN PATENTS

| | | |
|---|---|---|
| 12,443 | Australia | Mar. 22, 1928 |

UNITED STATES PATENT OFFICE
CERTIFICATE OF CORRECTION

Patent No. 3,025,250                                March 13, 1962

Franklin W. Herrick et al.

It is hereby certified that error appears in the above numbered patent requiring correction and that the said Letters Patent should read as corrected below.

Column 1, line 20, for "purpose" read -- purposes --; column 6, line 42, for "he" read -- the --; column 9, line 55, for "as" read -- was --; same line 55, for "The" read -- Then --; column 11, line 57, for "withou" read -- without --; column 14, line 21, for "fluid" read -- liquid --.

Signed and sealed this 26th day of June 1962.

(SEAL)
Attest:

ERNEST W. SWIDER
Attesting Officer

DAVID L. LADD
Commissioner of Patents